United States Patent Office 3,198,843
Patented Aug. 3, 1965

3,198,843
PURIFICATION OF GLYCERINE
Robert S. Barker, Port Washington, N.Y., assignor to Halcon International, Inc., a corporation of Delaware
No Drawing. Filed Jan. 26, 1962, Ser. No. 169,110
5 Claims. (Cl. 260—637)

This invention is a continuation-in-part of copending application Ser. No. 837,769 filed September 3, 1959, now abandoned.

This invention is concerned with methods for purifying glycerine. More particularly, this invention is concerned with methods for oxidatively treating glycerine to effect a purified product upon distillation. Specifically, this invention is concerned with methods for purifying glycerine containing contaminants boiling in a range close to glycerine, particularly where these contaminants are unsaturated organic compounds.

It is known in the art that various methods may be employed to remove impurities which are present in crude glycerine products. It has been found that oxidatively treating aqueous solutions of glycerine prior to distillation will remove many of these contaminants. One relatively expensive method which has been employed is treatment with silver nitrate.

The art has been troubled, however, by the problems which arise in removing such contaminants by distillation, when said contaminants boil in a range close to glycerine.

This problem is particularly troublesome when glycerine is produced by the fermentation process from molasses. The resulting product contains color bodies which are difficult to remove and are speculated to include olefin linkages, acetals, carbonyl groups and other unsaturated organic contaminants which are susceptible to selective oxidation by hydrogen peroxide. The presence of these contaminants which boil in a range close to glycerine results in a product which is not satisfactory as reagent grade glycerine even after the crude is twice distilled and treated with carbon.

Utilization of the present invention successfully eliminates these contaminants and enables a reagent grade glycerine product to be produced from the fermentation process.

It has been found that treatment utilizing hydrogen peroxide as the oxidizing material, in the presence of a small percentage of oxygen-containing metal catalyst selected from the group consisting of vanadates, molybdates, tungstates, chromates, plumbates and ruthenates or mixtures thereof, results in a glycerine product which is far superior in meeting reagent grade specification to a product which has been obtained by utilizing other treatments.

A feature of the present invention is a process for the purification of glycerine containing contaminants boiling in the range close to glycerine, comprising oxidatively treating glycerine with hydrogen peroxide in combination with an oxygen containing compound such as vanadates, molybdates, tungstates, chromates, plumbates and ruthenates, and thereafter separating glycerine from the solution.

Another feature of the present invention is a process for the purification of glycerine containing contaminants boiling in the range close to glycerine, comprising oxidatively treating an aqueous solution of said glycerine with hydrogen peroxide and at least one of the aforesaid oxygen-containing metal catalysts, and thereafter separating glycerine from the thus treated aqueous solution.

Another feature of the present invention is the utilization of the above-mentioned process, particularly where the contaminants are unsaturated organic compounds.

Still another feature of the present invention is in a process for the purification of glycerine by fermentation of molasses, the step of oxidatively treating an aqueous solution of glycerine with hydrogen peroxide and an oxygen-containing metal catalyst selected from the class consisting of vanadates, molybdates, tungstates, chromates, plumbates, and ruthenates or mixtures thereof, and thereafter separating glycerine from the thus treated aqueous solution.

Another feature of the invention is a process for the purification of glycerine containing contaminants boiling in the range close to glycerine, comprising oxidatively treating an aqueous solution of said glycerine with hydrogen peroxide, and an oxygen-containing metal catalyst selected from the class consisting of vanadates, molybdates, tungstates, chromates, plumbates, and ruthenates or mixture thereof, and thereafter separating glycerine from the thus treated aqueous solution by fractional distillation.

In a preferred embodiment of the invention, the fraction distillation step comprises a first fractionation to remove compounds boiling in a range slightly higher than glycerine.

The hydrogen peroxide is present from 0.1 to 10 wt. percent based on weight of glycerine, preferably 0.2 to 5 wt. percent. The oxygen containing catalysts are effective when from 0.001 to 1.0 wt. percent are present, preferably 0.01 to 0.5 wt. percent. The catalysts are in the form of water soluble salts, for example, those compounds wherein the cation is selected from a group consisting of the alkali metals, alkaline earth metals and ammonium.

EXAMPLE 1

Two gallons (9550 grams) of dynamite grade glycerine are mixed with one gallon distilled water and 175 ml. of 30% hydrogen peroxide solution (58 grams, 100% $H_2O_2$ and a total of 3930 grams of water). To this is added one gram each ammonium molybdate

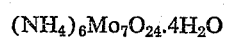

$(NH_4)_6Mo_7O_{24} \cdot 4H_2O$ and one gram of ammonium meta-vanadate $NH_4VO_3$. The resulting solution is warmed rapidly to 65° C. and then over a three-hour period to 90° C. Vacuum is applied by means of a water aspirator and the material is dried by boiling off the water. This is stopped when the remaining glycerine is at approximately 140° C. The color at this stage is a dark brownish black. There is a pronounced sweet odor.

The glycerine is then fractionally distilled as follows:

The material is first continuously fed to the top of a stripping still at the rate of one liter per hour, operating at a pressure of approximately 70 mm. Hg absolute. Approximately 1330 gm. per hour of superheated steam is fed to the base of the column. The product is collected in the pot, and the overhead sweet waters are discarded. The reflux to feed ratio is approximately four to one. The stripped product is then batch refined in the same column, using about 1000 gm. per hour of superheated steam as a carrier gas and a column pressure of approximately 90 mm. Hg. The pot temperatures are maintained at approximately 180° C. for the stripping operation and 190° C. for the refining operation.

The distilled material (which is odorless and extremely pale, much lighter in color than the initial sample) is then treated with carbon in the following proportions:

Distilled glycerine _____ gallons__ 1
Activated charcoal (Norite A) _____ grams__ 30
Diatomaceous earth (Dicolite) heated to 110° C.
  for a period of one-half hour, dried under aspirator vacuum, and filtered _____ grams__ 30

The resulting product is water-white glycerine of over 98% assay and passes ACS reagent grade specification tests, as shown in Table 1 below (Column A).

EXAMPLE 2

The procedure of Example 1 is repeated using two gallons of dynamite grade glycerine, except that the hydrogen peroxide, ammonium meta-vanadate treatments are omitted. The resulting product is a pale straw glycerine which fails to pass ACS reagent grade specification tests, as shown in Table 1 below (Column B).

The hydrogen peroxide treatment of the present invention is preferably performed in an aqueous solution of glycerine in order to dilute the hydrogen peroxide concentration to prevent local side reactions and also to reduce the viscosity of the mixture to obtain better mixing. The hydrogen peroxide is most commonly commercially available in a 35% aqueous solution.

*Table 1*

TESTS OF GLYCERINE PRODUCTS

| Test | A [1] | B [2] |
|---|---|---|
| Sp. gr. at 25/25° C | 1.261 | 1.261. |
| Equiv. percent Glycerol | 99.6 | 99.6. |
| Equiv. sp. gr. at 15.6/15.6° C | 1.2643 | 1.2643. |
| Karl Fisher moisture, percent | 1.6 | 1.2. |
| Chloride, ACS | Pass | Pass. |
| Acidity, ACS | Pass | Pass. |
| Sulphate, ACS | Pass | Fail. |
| Color, ACS | Pass | Fail. |
| Hazen (eye estimate) | 15 | Too Dark. |
| Heavy Metals, ACS | Pass | Pass. |
| Fatty Acid Ester, ACS | Pass | Fail. |
| Silver Nitrate Test, ACS | Borderline | Fail. |
| Sulphuric Acid, ACS | Pass | Fail. |

[1] This sample is the product of Example 1.
[2] This sample is the product of Example 2.

EXAMPLE 3

The procedure of Example 1, is repeated except that sodium tungstate is employed in place of ammonium molybdate and ammonium meta-vanadate. Comparable results to those of Example 1 are obtained.

EXAMPLE 4

The procedure of Example 1 is repeated except that potassium chromate is employed in place of ammonium molybdate and ammonium meta-vanadate. Comparable results to those of Example 1 are obtained.

While the glycerine treatment preferably is carried out in an aqueous solution for the foregoing reasons, it is to be understood that this is only a preferred embodiment of the invention and the treatment may be carried out in a solution of glycerine in a volatile organic solvent such as methanol, acetone, isopropyl alcohol or equivalent solvents, which may be later separated by distillation.

EXAMPLE 5

The procedure of Example 1 is repeated except that an organic solvent, isopropyl alcohol, is employed in place of distilled water. Comparable results to those of Example 1 are obtained.

EXAMPLE 6

The procedure of Example 5 is repeated using acetone instead of isopropyl alcohol as the organic solvent. Comparable results of those of Example 1 are obtained.

EXAMPLE 7

The procedure of Example 6 is repeated using methanol instead of isopropyl alcohol as the organic solvent. Comparable results to those of Example 1 are obtained.

EXAMPLE 8

Hydrogen peroxide vapor is mixed with a substantially inert gas, nitrogen, and is bubbled through a sparger into a glycerine sample. To this is added the ammonium molybdate and ammonium meta-vanadate catalysts. The glycerine is heated to reaction temperature and at this stage the color of the sample is a dark brownish black. There is a pronounced sweet odor. The mixture is distilled following the procedure of Example 1, and comparable results to the foregoing are obtained.

In view of the foregoing disclosure, variations and modifications thereof will be apparent to one skilled in the art, and it is intended to include within the invention all such variations and modifications except as do not come within the scope of the appended claims.

What is claimed is:

1. A process for the purification of glycerine obtained from the fermentation of molasses and containing impurities boiling close to the range of glycerine which comprises: contacting an aqueous solution of said glycerine with from 0.1 to 10 wt. percent of hydrogen peroxide an from 0.001 to 1.0 wt. percent based on glycerine of a water soluble compound selected from the group consisting of molybdates, vanadates, tungstates and chromates, said water soluble compounds having a cation selected from the group consisting of alkali metals, alkaline earth metals and ammonium; stripping the contacted glycerine of impurities boiling at a temperature less than that of glycerine, distilling the stripped glycerine; withdrawing a distillate containing purified glycerine; contacting said purified glycerine with an adsorbent and withdrawing a water white glycerine product.

2. The process of claim 1 wherein from 0.2 to 5 wt. percent of hydrogen peroxide is present.

3. The process of claim 1 wherein from 0.01 to 0.5 wt. percent of said water soluble compound is present.

4. The process of claim 1 wherein the absorbent is a mixture of activated carbon and diatomaceous earth.

5. A process for the purification of glycerine obtained from the fermentation of molasses and containing color bodies boiling in a range close to glycerine which comprises: contacting said glycerine with from 0.1 to 10 wt. percent of hydrogen peroxide and from 0.001 to 1.0 wt. percent based on glycerine of ammonium molybdate and ammonium vanadate at a temperature of from 65 to 90° C.; stripping the contacting glycerine of impurities boiling at a temperature less than glycerine, distilling the stripped glycerine, and withdrawing a distillate containing purified glycerine.

References Cited by the Examiner

UNITED STATES PATENTS 2,120,227   6/38   Brant _____ 260—637

FOREIGN PATENTS 278,703   12/28   Great Britain.

OTHER REFERENCES

Groggins: Unit Processes in Org. Synthesis (4th Ed.), (1952), pp. 421–4.

LEON ZITVER, *Primary Examiner.*

CHARLES B. PARKER, *Examiner.*